May 17, 1932.  H. C. BERRY  1,859,228
TACKLE BOX
Filed July 21, 1928   3 Sheets-Sheet 1

INVENTOR
HERBERT C. BERRY
By Paul, Paul & Moore
ATTORNEYS

May 17, 1932. H. C. BERRY 1,859,228
TACKLE BOX
Filed July 21, 1928  3 Sheets-Sheet 2
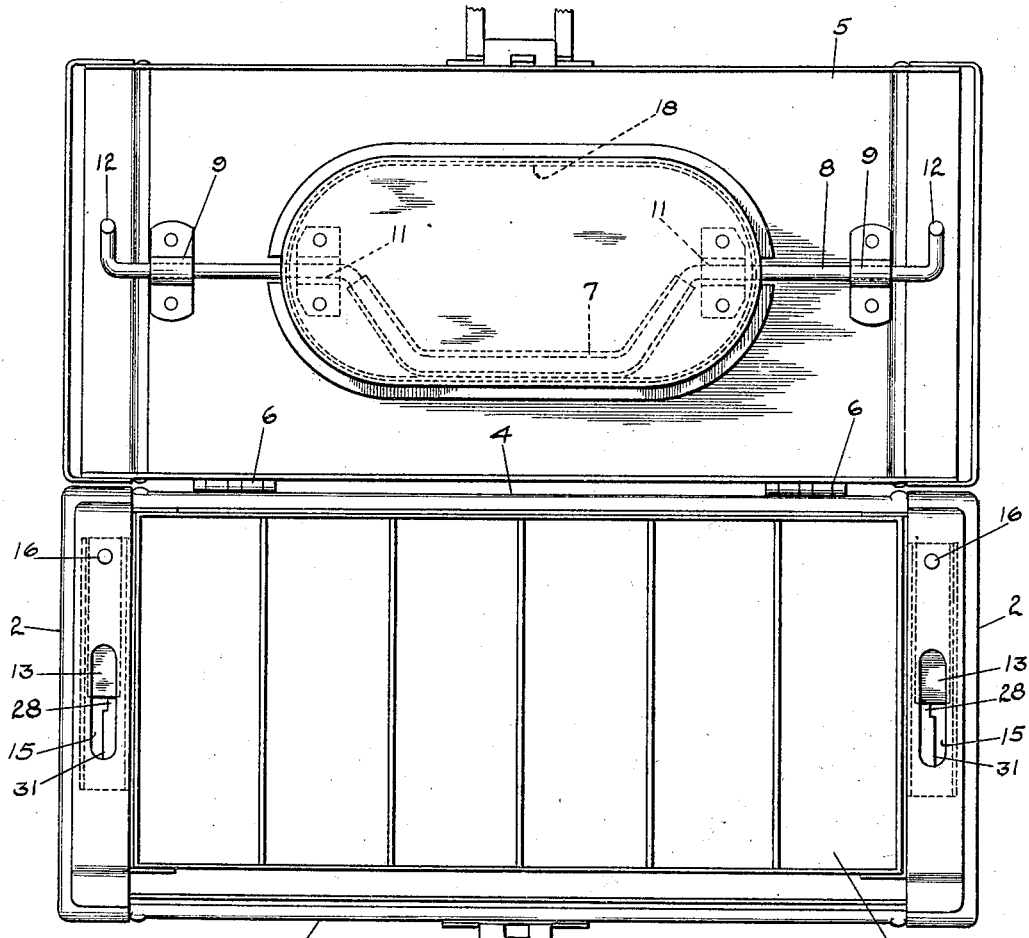
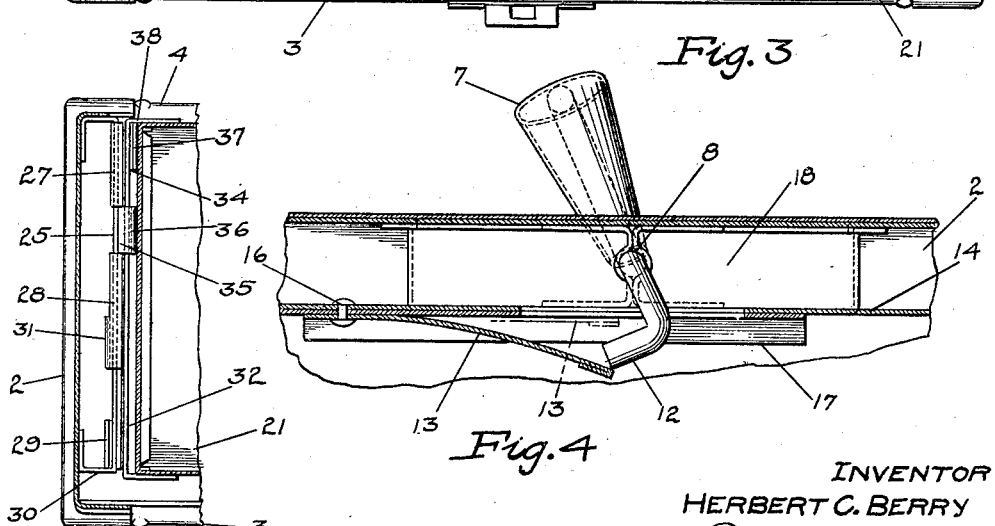
INVENTOR
HERBERT C. BERRY
By Paul, Paul & Moore
ATTORNEYS May 17, 1932.   H. C. BERRY   1,859,228
TACKLE BOX
Filed July 21, 1928    3 Sheets-Sheet 3
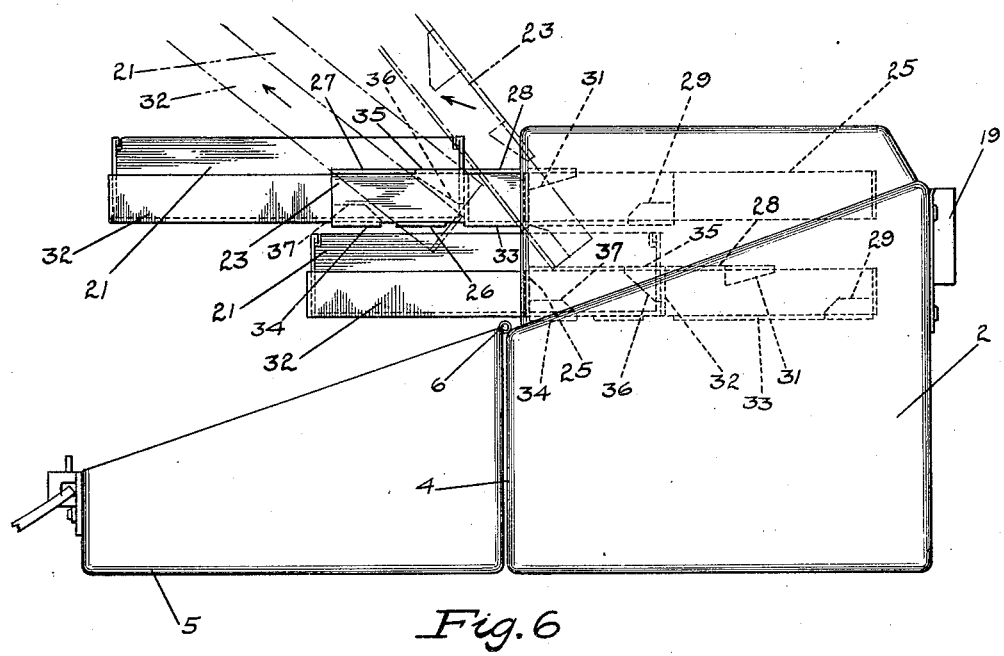
Fig. 6
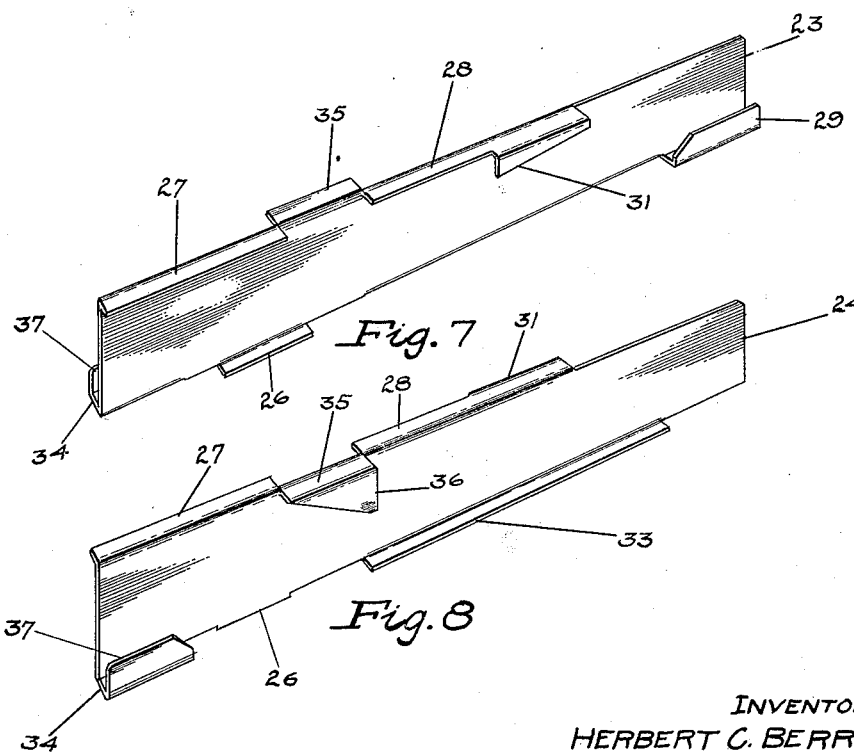
Fig. 7
Fig. 8
INVENTOR
HERBERT C. BERRY
By Paul, Paul & Moore
ATTORNEYS Patented May 17, 1932

1,859,228

UNITED STATES PATENT OFFICE

HERBERT C. BERRY, OF MINNEAPOLIS, MINNESOTA, ASSIGNOR, BY MESNE ASSIGNMENTS, TO NATIONAL SUPPLY COMPANY, OF MINNEAPOLIS, MINNESOTA, A CORPORATION OF MINNESOTA

TACKLE BOX

Application filed July 21, 1928. Serial No. 294,329.

This invention relates to new and useful improvements in tackle boxes, and an object of the invention is to provide a tackle box having a hinged cover provided with a pivoted handle having means thereon adapted to engage the end walls of the box to secure the cover in box-closing position, when the handle is in operative or box-lifting position, and the cover being as readily unlocked by simply oscillating the handle from one position to another.

A further object of the invention is to provide a tackle box having a cover provided with a pivoted handle, mounted in a depression formed in the upper wall of the cover, and the handle having opposed extensions each provided with a terminal hook adapted to engage flexible locking members or plates, mounted upon the end walls of the box, said members being so positioned that when the handle is in upright or box-lifting position, and the cover is moved into box-closing position, the hooks will engage the plates and flex or depress them to a position whereby, when the handle is oscillated, the yieldable plates will move into position to be engaged by the hooks when the handle is returned to an upright box-lifting position, thereby providing a tackle box having a handle which not only functions as a means for carrying or transporting the tackle box, but which also provides a lock for the box cover, and which is so arranged that it cannot accidentally be unlocked while the box is being carried by the handle from one place to another.

A further object of the invention is to provide a tackle box comprising a plurality of trays mounted in superimposed relation, and each supported upon a pair of slides permitting independent movement of the trays; said slides also being detachably mounted in the box so that they may readily be removed therefrom when desired.

The particular object of the invention therefore is to provide an improved tackle box.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification:

Figure 3 is a plan view of the box, showing the cover in open position and the handle in the position assumed when the cover is opened;

Figure 4 is an enlarged detail sectional view, showing the hook elements connected with the handle, engaged with the flexible locking plates provided upon the end walls of the box;

Figure 5 is a detail plan view on the line 5—5 of Figure 1, showing the means provided at the ends of the box for supporting the slides;

Figure 6 is a side elevation of the box showing the cover in open position and the trays extended from the box;

Figure 7 is a perspective view of one of the slides removed from the box; and

Figure 8 is a similar view, showing one of the slides used at the opposite end of the box.

The novel tackle box features in this invention comprises a body having end walls 2—2, a front wall 3 and the back wall 4. A cover 5 is hinged to the back wall 4, as indicated at 6, and provides a closure for the box, as shown in Figures 1 and 2.

Figure 1:
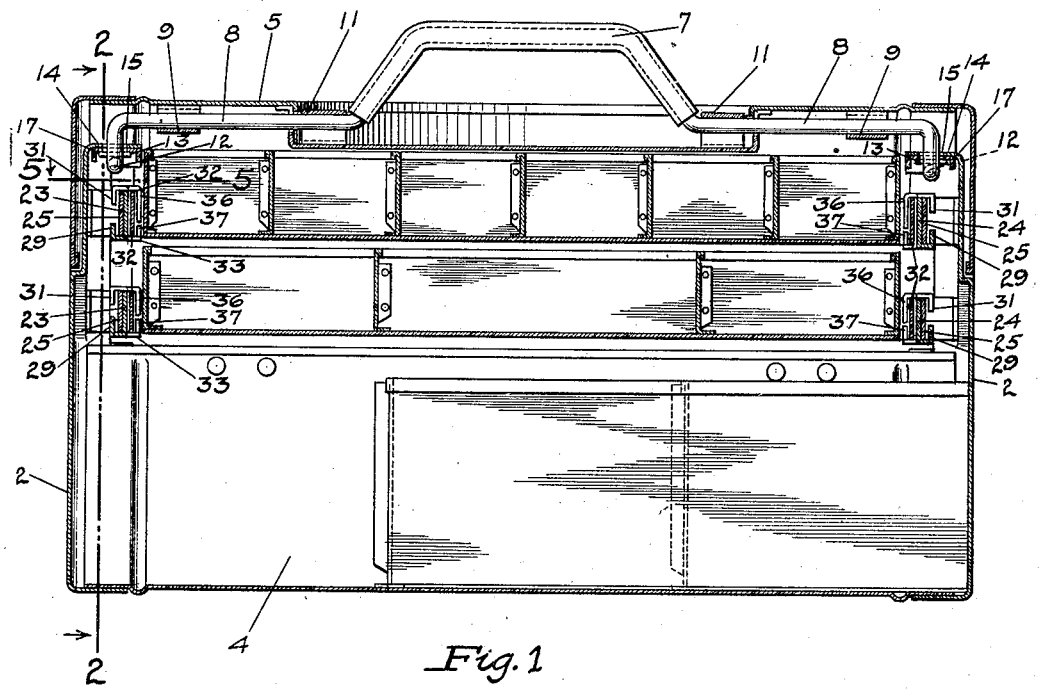
Figure 1 is a longitudinal sectional view of the improved box, showing the handle in cover-locking position.
Figure 2:
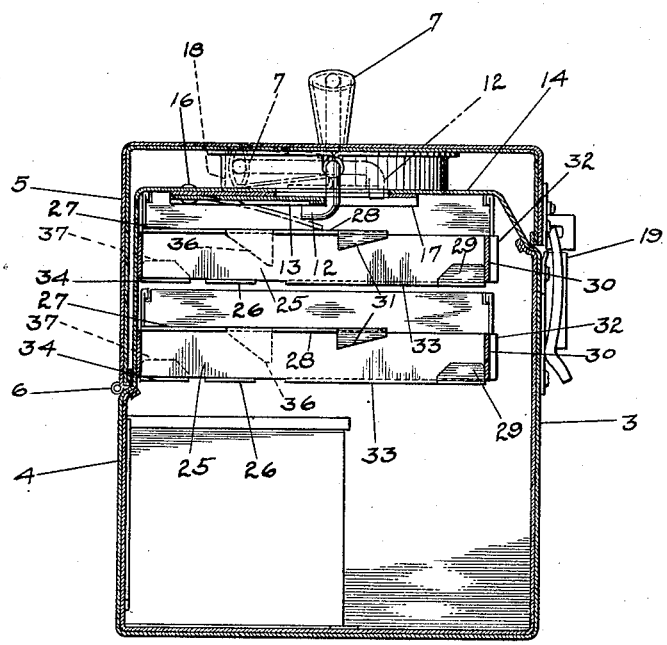
Figure 2 is a cross-sectional view on the line 2—2 of Figure 1.

An important feature of this invention resides in the means provided for locking the cover 5 in box-closing position, shown in Figures 1 and 2. In the tackle box here shown, the cover 5 is adapted to be locked to the end walls 2 of the box body by movement of the handle 7. The handle 7 is provided with opposed end portions or extensions 8, pivotally mounted in bearings 9 and 11 provided at each end of the cover.

Each extension 8 has a terminal hook 12 adapted to engage a flexible member or plate 13, secured to the flanges 14 provided at the upper portions of the end walls 2, as shown in Figure 1. These flanges extend inwardly towards the center of the box, and each is provided with an elongated opening 15, beneath which the yieldable plates 13 are mounted as particularly shown in Figure 3. Each plate 13 is secured to each respective flange 14 by means of a rivet 16, and the plates are normally held in the position shown in full lines in Figure 2 by the tension in the metal. A flanged reinforcing member 17 is secured to the underside of each flange 14 to suitably strengthen the latter around the elongated opening 15. These reinforcing members are shown in Figures 1, 2, 3 and 4.

A depression 18 is centrally provided in the cover 5, and in this depression the bearings 11 are located, as shown in Figures 1 and 3. The depression 18 is sufficiently wide to permit the handle portion 7 to be moved to a horizontal position, as indicated in dotted lines in Figures 2 and 3. When the handle is thus positioned, the hooks 12 will be positioned as indicated in dotted lines in Figure 2, thereby permitting them to enter the open portions of the slots 15, when the cover is moved into closing position. When the cover has been moved into box-closing position, the handle 7 is moved from the dotted line position shown in Figures 2 and 3, to the full line position, shown in Figures 1 and 2, thereby causing the hook elements 12 to engage the bottom sides of the yieldable plates 13, thereby preventing the cover from opening, when the box is lifted by the handle 7. It will therefore be seen that when the handle is in the position shown in Figures 1 and 2, the box may be transported from one place to another without any danger of the cover accidentally opening.

The tension in the plates 13 permits the cover to be moved into box-closing position, when the handle is in its raised or operative position, as shown in full lines in Figures 1 and 2, because the plates 13 will flex when engaged by the hook members 12, as shown in Figure 4. When the cover is thus closed and the handle 7 is oscillated, the hook elements will move out of engagement with the plates 13 and permit them to return to their normal positions, substantially parallel to the flanges 14, after which the handle is returned to its upright position, thereby causing the hooks 12 to lockingly engage the plates 13. If desired, a suitable lock 19 may be provided at the front of the box for positively locking the cover in closed position.

The novel tackle box featured in this invention preferably includes a plurality of movable trays 21, normally concealed within the box and adapted for independent movement as indicated in Figure 6. Another feature of the invention resides in the means provided for supporting the trays 21, whereby they may quickly be removed from the box or extended therefrom to permit access to the compartments provided beneath the lower tray.

The means provided for thus supporting each tray is best shown in Figures 7 and 8, and comprises a pair of slides 23 and 24, each adapted to be slidably supported upon a track 25, provided at each end of the box, as shown in Figure 1. The tracks 25 are preferably secured to the end walls 2 by suitable means such as electric spot welding, and are spaced from their respective end walls as shown. Each slide has a bottom flange 26 and upper flanges 27 and 28, all facing outwardly and adapted to engage the lower and upper edges of the tracks 25. An outwardly and up-turned flange 29 cooperates with the flange 26 to engage the lower edge of the track 25. Each flange 28 also has a depending portion 31 adapted to engage one end of the track 25, to limit outward movement of the slide thereon. The flanges 26, 27, 28 and 29 are so arranged and constructed that each slide may be quickly disengaged from the track 25, as indicated in dotted lines in Figure 6.

A bar 32 is secured to each end of each tray, and is adapted to be engaged with the inwardly projecting flanges 33 and 34, provided at the bottom of each slide, and with a flange 35 provided at the upper edge of each slide. Each flange 35 has a depending portion 36 adapted to be engaged by one end of respective bar 32, secured to the end of the tray as shown in Figure 5. When the top tray is pulled outwardly to the position shown in Figure 6, the depending portions 31 of the flanges 28 will engage the ends of the tracks 25, and likewise, the ends of the bars 32, provided at the ends of each tray, will engage the depending portion 36 of the flanges 35, thereby limiting outward movement of the tray. The tray will be retained in its extended position by means of the flanges 34 and 35, between which the bar at each end of the tray will be positioned so that the outer edge or side of the tray cannot be moved downwardly without tilting the entire box. Inward movement of the trays is limited because of the lugs or flanges 29 engaging the offset end portions 30 of the tracks 25, and the up-standing portion 37 of the lug 34 engaging the end portion 38 of the lug 34, as shown in Figure 5.

The formation of the flanges 34 and 35 is also such that the tray may be quickly removed from the slides, as indicated by the dotted lines in Figure 1, and, without having to remove any bolts or screws. It will also be noted that each slide is formed of one piece of metal, and the flanges provided thereon are so arranged that no bolts or screws or other securing means are necessary to retain the slides on their respective tracks 25. In like manner, the trays are supported upon their respective slides by simply inserting the bars 32, provided at the ends thereof, between lugs or flanges 34 and 35, provided upon the slides 23 and 24.

The novel tackle box here shown, has been found very desirable because of the peculiar construction of the handle lock for the cover, which permits the cover to be quickly locked in position to the box walls without the use of a key or the usual hasps, and whereby the tackle box may be carried from place to place without danger of the cover becoming unlocked. When desired, the cover may be as quickly opened, by simply oscillating the handle 7 from one position to another. The mounting of the trays in the box is also such that access may be quickly had to the compartments in the lower portion of the box and, if desired, the trays may be quickly removed from the box for repairs or cleaning or other purposes, and may be as quickly inserted therein. The trays are also independently movable, and the slides 23 and 24 cooperate with the tracks 25 and the bars 32 at the ends of the trays, to provide a comparatively long bearing for the trays when in extended position, whereby the trays will not bind in their supporting means. The box is also very simple and inexpensive in construction, and the organization of the parts is such that the box may be assembled in a comparatively short length of time, thus decreasing the cost of manufacture as compared with devices of this kind now in use.

I claim as my invention:

1. A tackle box having a hinged cover provided with a pivoted carrying handle, hook elements directly connected with said handle, and yieldable members secured to the end walls of the box and positioned to be engaged by said hook elements and to flex when the cover is moved into box-closing position with the handle in operative position, oscillation of the handle, when the cover is in closed position, causing the hook elements to move into locking engagement with said yieldable members.

2. A tackle box having a hinged cover provided with a pivoted carrying handle, hook elements connected with said handle, a horizontal flange at the upper portion of each end wall of the box, and yieldable means secured to said flanges and adapted to be engaged by said hook elements to lock the cover in box-closing position, when the handle is moved into box-lifting position.

3. A tackle box having a hinged cover provided with a pivoted carrying handle, hook elements directly connected with said handle, an inwardly turned flange at the upper portion of each end wall of the box, and a flexible locking plate secured to each flange and adapted to be engaged by said hook elements to lock the cover in box-closing position, when the handle is moved from a horizontal to a vertical position.

4. A tackle box having a hinged cover provided with a pivoted carrying handle, hook elements directly connected with said handle, an inwardly turned flange at the upper portion of each end wall, an elongated aperture in each flange, and a plate secured to each flange and overlying the slot therein and adapted to be engaged by said hook elements, when the cover is moved into box-closing position, movement of the handle into box-lifting position causing said hook elements to move into locking position with said yieldable means.

5. A tackle box having a hinged cover provided with a carrying handle, hook elements directly connected with said handle, horizontally disposed yieldable plates secured to the end walls of the box and positioned to be engaged by said hook elements and to flex to permit the handle to be moved into box closing position, when the handle is in box-lifting position, oscillation of the handle when the cover is in closed position, causing the hook elements to move into locking engagement with said yieldable plates.

6. A tackle box having a hinged cover provided with a central depression, a carrying handle pivotally mounted in said depression exteriorly of the cover and adapted to be positioned therein beneath the plane of the cover wall, opposed extensions on said handle projecting through the upright walls of said depression and positioned beneath cover wall and within the box, terminal hooks on said extensions, and means on the end walls of the box adapted to be engaged by said hooks to lock the cover in box-closing position, when the handle is moved to an upright box-lifting position.

In witness whereof, I have hereunto set my hand this 16th day of July, 1928.

HERBERT C. BERRY.